United States Patent [19]
Wilde

[11] 3,909,971
[45] Oct. 7, 1975

[54] SYSTEM FOR CULTIVATING OF CULCHLESS OYSTERS

[76] Inventor: Frank W. Wilde, Shady Side, Md. 20867

[22] Filed: Jan. 20, 1975

[21] Appl. No.: 542,306

[52] U.S. Cl. ........................................ 43/6.5; 119/4
[51] Int. Cl.² ........................................ A01K 61/00
[58] Field of Search ............................ 43/6.5; 119/4

[56] References Cited
UNITED STATES PATENTS

| | | | |
|---|---|---|---|
| 1,023,531 | 4/1912 | Shafer | 119/3 X |
| 1,717,835 | 6/1929 | Calhoun | 43/6.5 |
| 2,672,700 | 3/1954 | Hanks, Jr. | 43/6.5 X |
| 3,419,990 | 1/1969 | Lewis et al. | 43/6.5 |
| 3,766,888 | 10/1973 | Wiegardt, Jr. | 119/4 |

*Primary Examiner*—Hugh R. Chamblee
*Assistant Examiner*—Daniel J. Leach
*Attorney, Agent, or Firm*—John F. McClellan, Sr.

[57] ABSTRACT

An off-bottom oyster culture system including: a series of floating trays held by paired bridle lines terminating at one end in sliding attachments on respective ends of the trays and terminating at the other end in fixed attachments to paired long lines laterally spaced and spaced above the water by stakes driven in the bottom, and an oyster tender boat having a substantially equal-size pair of cockpits fore and aft and a low, decked-over midsection of a size to receive and stabilize one tray at a time in oyster tending operations; the tray construction includes a flotative top of special design and attachment relation to the tray, perforate, tapered sides, perforate bottom and horizontal bridle line attachment slots in perforate ends. A method of co-active operation of the tray and boat system provides positive handling and cleaning advantages.

17 Claims, 11 Drawing Figures

FIG. 1a  OLD ART

FIG. 8(a) OLD ART

SYSTEM FOR CULTIVATING OF CULCHLESS OYSTERS

This invention relates generally to marine culture and specifically to off-bottom maturation of shellfish.

Since 1900 oyster population in the United States has declined to 10% of what it was. The eastern oyster *Crassostrea Virginica* is disappearing in the waters of Maine, New Hampshire and Massachusetts, and in Long Island Sound and Delaware Bay, and more gradually in Chesapeake Bay, leaving natural bars barren. The bottoms at the barren bars are no longer suitable for oyster production and/or reproduction.

Development of more successful methods of oyster farming is imperative in view of domestic demand for oysters and world need for protein in areas where the sea is the major untapped agricultural resource.

Artificial cultivation of oysters was practiced in Japan as early as the 1600's and successful off-bottom culture apparently originated there in the early 1900's, using the principal of hanging culture.

Off-bottom oyster farming progress in the United States has been slow to date. Although showing promise in experiments of doubling growth-rate, improving meat quality (percentage solids), reducing mortality rate, and employing areas having unsuitable bottoms, results have been generally uneven to date. In particular, the very promising approach to oyster farming employing culchless seed oysters has been known for some years, and has been described in various United States patents, but the potential for improvement over the traditional hanging method of off-bottom oyster farming has not been fully realized.

Raising oysters from culchless seed stock presents several problems peculiar to the method, including the need to employ special containers for small oysters, primarily for protection from predators, and the need to clean the closely packed oysters periodically as they grow, both operations entailing handling floating trays in conditions obtaining in natural saltwater estuaries.

In the prior art, numerous systems for shellfish culture have been disclosed, including container devices floating or suspended above the bottom of a body of water.

Among such systems are those described in the following U.S. Patents: U.S. Pat. No. 3,766,888 issued to J. L. Wiegardt, Jr. on Oct. 23, 1973, disclosing a raft type oyster container with top flotation and shield members held under transverse structure of the raft; U.S. Pat. No. 3,741,159 issued to L. N. Halaunbrenner on June 26, 1973, disclosing plastic construction and a top flotation and shield structure in circular configuration; U.S. Pat. No. 3,017,857 issued to O. J. Munz on Jan. 23, 1962, disclosing a growing and harvesting system employing a boat; and U.S. Pat. No. 1,023,531 issued to C. E. Shafer on Apr. 16, 1912 disclosing the use of serially related containers in oyster culture operations.

The present invention is primarily directed to maturation of culchless oysters, and may be used for other shellfish; however, no other system of off-bottom oyster culture, culchless or not, is known to provide the general advantages and results of the present invention.

Objects of the present invention are to supply a system as described which: makes feasible profitable one-man oyster farming by providing the largest possible growth rate, yield, and meat quality for a given amount of effort; provides a maximum of safety and ease in oyster tending operations under adverse weather conditions in estuarial waters, and protects the oysters being grown against damage from rough waters and other hazards to a degree not previously possible in systems of the type disclosed; requires relatively low initial investment and outlay for maintenance and repair; affords relatively easy installation and relocation requiring no unusual skills or dangerous exertions; provides at no extra cost the capacity for coordinated two-man oyster tending, when desired for extra speed and multiplied capacity, or for tending in heavier weather conditions; prevents damage to the tray structures and to the oyster tender boat employed in wind and sea conditions which would tend to damage or destroy most prior-art systems; employs a minimum of different types of equipment and provides maximum time-utilization of the types of equipment employed; and which is generally practical and adapted for wide-scale production and use.

In brief summary given for cursive-description purposes only, the system of this invention includes a series-array of floating oyster trays secured by a novel bridle line-long line arrangement affording broadside manual-tending access along the series to an oyster tender boat having special deck and other provisions for safe, easy, speedy oyster tending.

The above and other objects and advantages of this invention will become more readily apparent on examination of the following description and the drawing in which like elements have like reference numerals.

FIG. 1a is an isometric view of an old art system;

FIG. 8a is a side view of an old art tray and line detail;

Turning now to the FIGURES in detail, FIG. 1 illustrates one of the prior art system arrangements, a cylindrical tray assembly T with an axial hole through which a bottom-driven stake S protrudes upwardly and supports the tray by means of lines L. When the tray is to be cleaned it is lifted upwardly to the position shown and is after cleaning lowered to a submerged position as indicated at the right. Handling such trays can be difficult, particularly for one man, especially if he must at the same time manage a boat B in wind, current, or both.

Figure 1B:
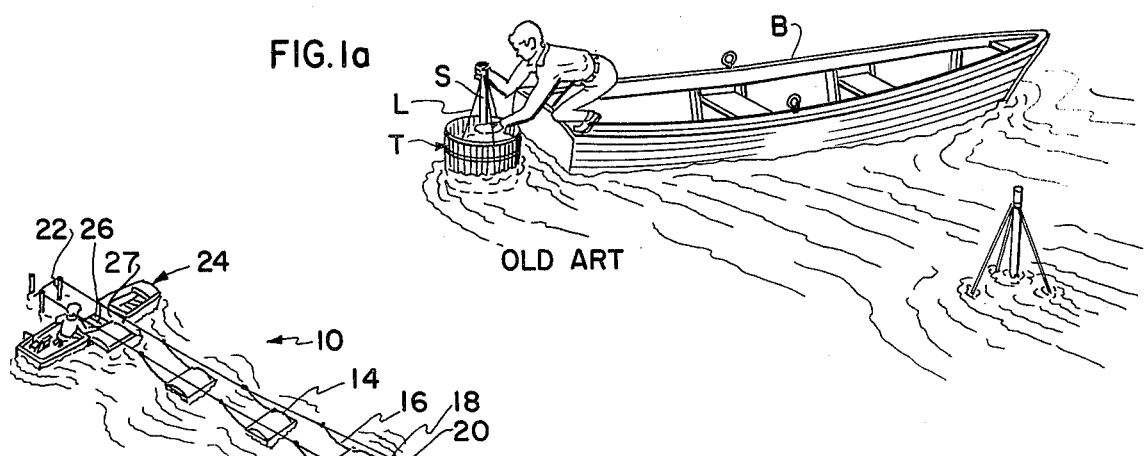
FIGS. 1b, 2, 3 and 4 are isometric views showing details of the system of this invention.

FIG. 1b illustrates generally the system of the present invention 10 in the form of a plurality of trays 14 with attachment at the ends of the trays by respective bridle or pendant lines 16 to a pair or long lines 18, 20 held in parallel-spaced disposition to each other and generally to the surface of the water by stakes 22 at each end of the long lines. The long lines extend in the direction of tidal ebb and flow, are spaced apart a distance slightly greater than the length of the trays, and are suspended above the water approximately 18 to 20 inches. The bridle lines, for average conditions of tide amplitude, may be about 4 feet long with 6-foot spacing between ties to the long lines.

The trays are preferably about 2 feet by 3 feet in plan, and 10 inches high.

Preferably about 25 trays are held by each set of long lines.

An oyster-tenderboat 24 with crew-shielding cockpit at each end and a low-decked-over midsection 26 is provided for enabling one man to tend the trays in comfort and safety, or alternatively for two men to tend the trays for greater speed, with each having equal access for tray handling. The oyster tender boat is preferably about 16 feet long, with a cockpit freeboard of 14 to 16 inches and a width of 3 to 4 feet. The midsection freeboard may advantageously be no more than 2 or 3 inches under normal load insuring low center of gravity and ease and safety in tray handling. The bulkhead 27 to bulkhead distance of the low midsection deck is preferably about 4 feet for convenience in oyster tending operations combined with crew safety and comfort, using the trays provided.

Figure 2:
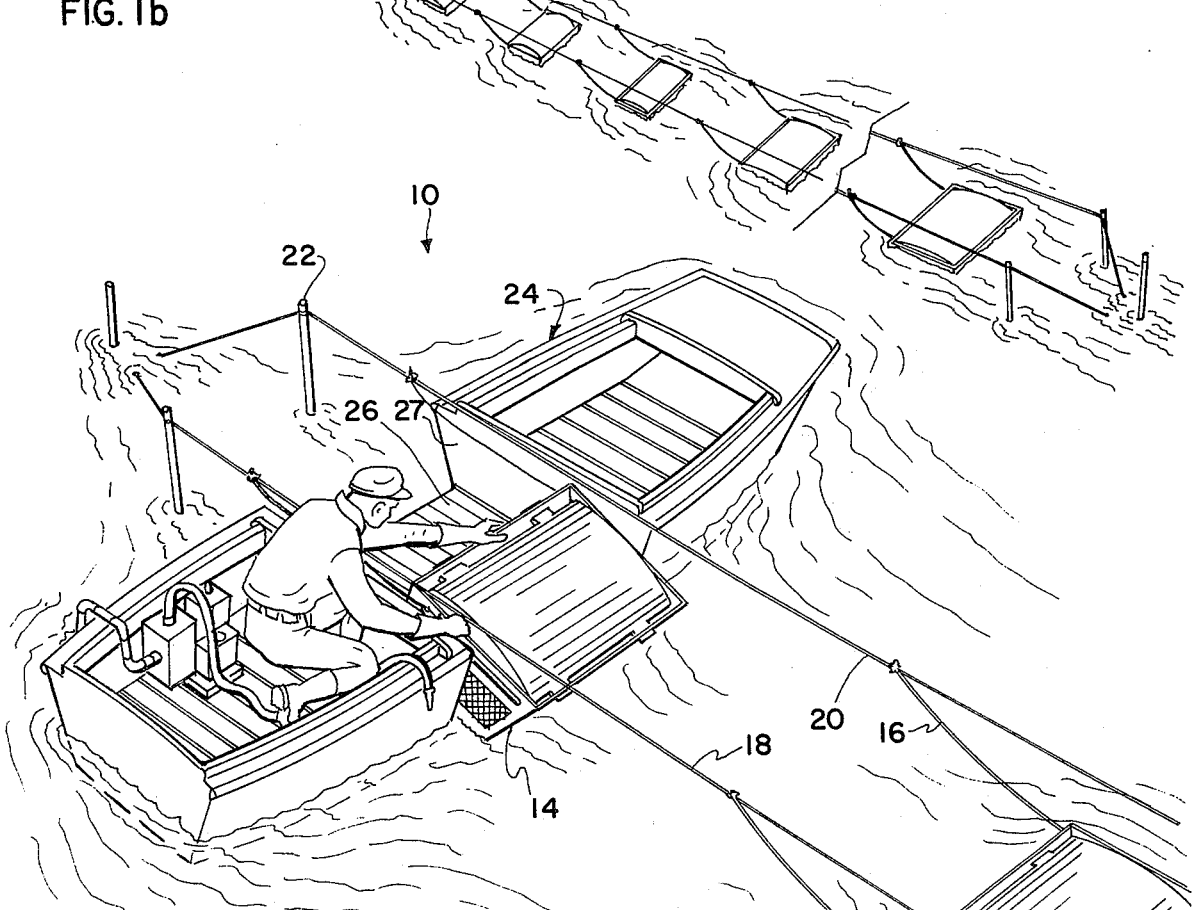
Figure 3:
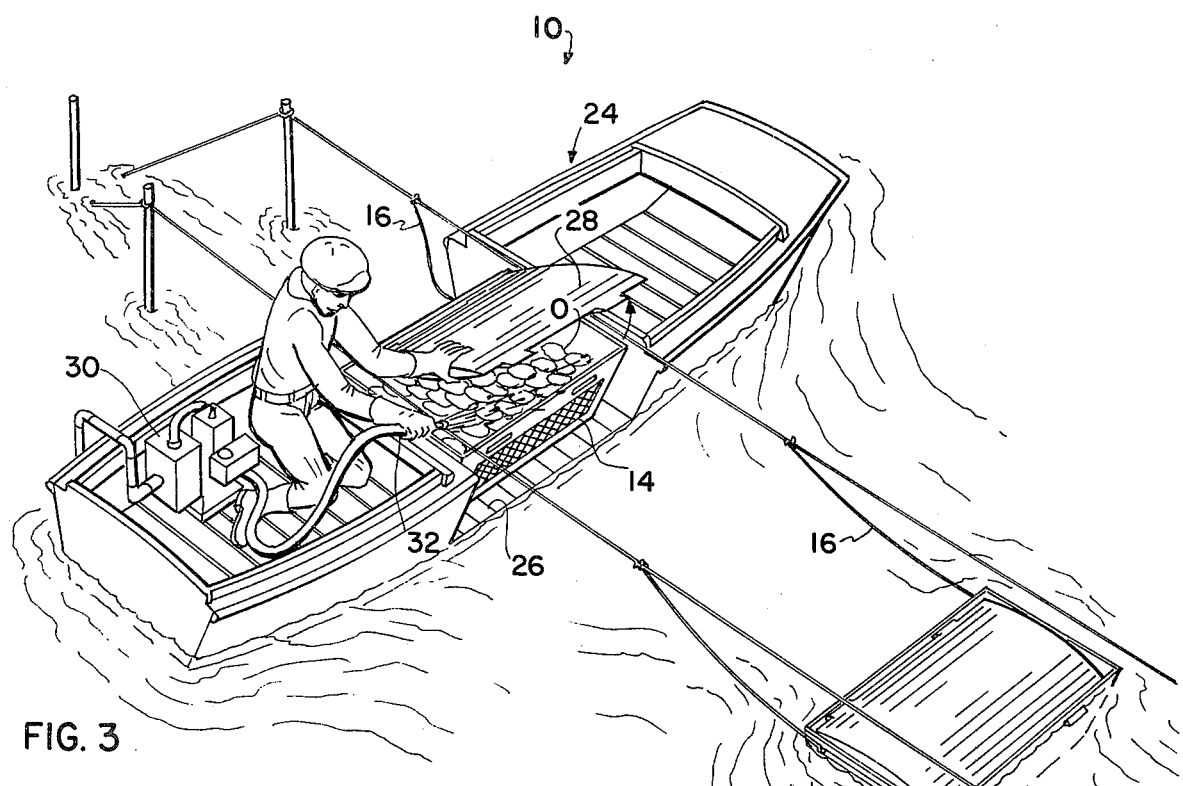
Figure 4:
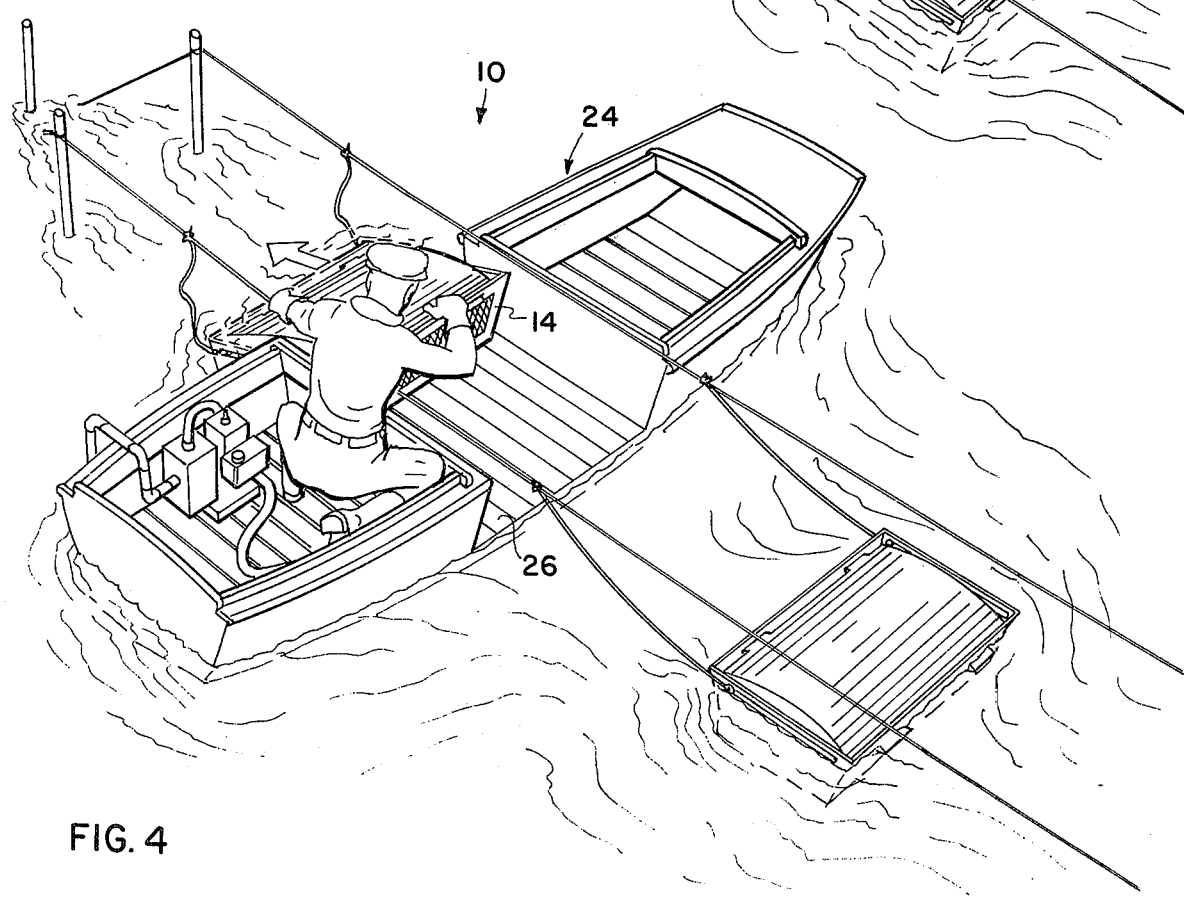

FIG. 2, 3 and 4 illustrate in sequence the general coaction of the parts of the system in tray cleaning operations; the same sequence is used in harvesting and in other oyster tending operations.

The oyster-tender boat is first moved to a position immediately above the tray on the end of the long lines which is upstream with respect to tidal flow at the time. The low midsection deck of the boat is maneuvered under the long lines in position to receive a tray.

FIG. 2 shows that as the boat drifts downstream against and beneath a tray, the tray is relatively easily hauled aboard the low midsection, which is proportioned to be almost awash for easiest tray manipulation, but with sufficiently freeboard for water to drain away from the bottom of the tray.

Each tray when carrying a full load of oysters weighs about 80 pounds, but the structure and method of operation of the present system makes fast handling possible, even for one man.

FIG. 3 illustrates the next step, raising, and, if desired, removing the top 28 of the tray, and hosing down the oysters O contained in the tray using ambient water forced by a gasoline-powered pump 30 and hose and nozzle 32. Feces and pseudo feces generated by the oysters are flushed out and carried away by the tide along with any other fouling material, greatly improving the growth rate and quality of the oysters. The cleaned trays, being on the upstream side, receive none of the dislodged impurities from later-cleaned trays.

FIG. 4 shows the succeeding step. Following replacement of the top, the tray is shoved off the upstream side of the decked-over middle section of the oyster tender boat, as the tide moves the boat broadside down to the next tray in the series, in position for bringing it aboard.

The process continues until all trays in the series have been cleaned, and the boat is then moved to the next series of trays.

Actual timing shows that a thorough job of cleaning each tray can be done by one man using the system of this invention in about 3 to 5 minutes, without straining. This contrasts favorably with old art systems, which require considerably more time, effort, strain, and in some cases, hazard.

Figure 5:
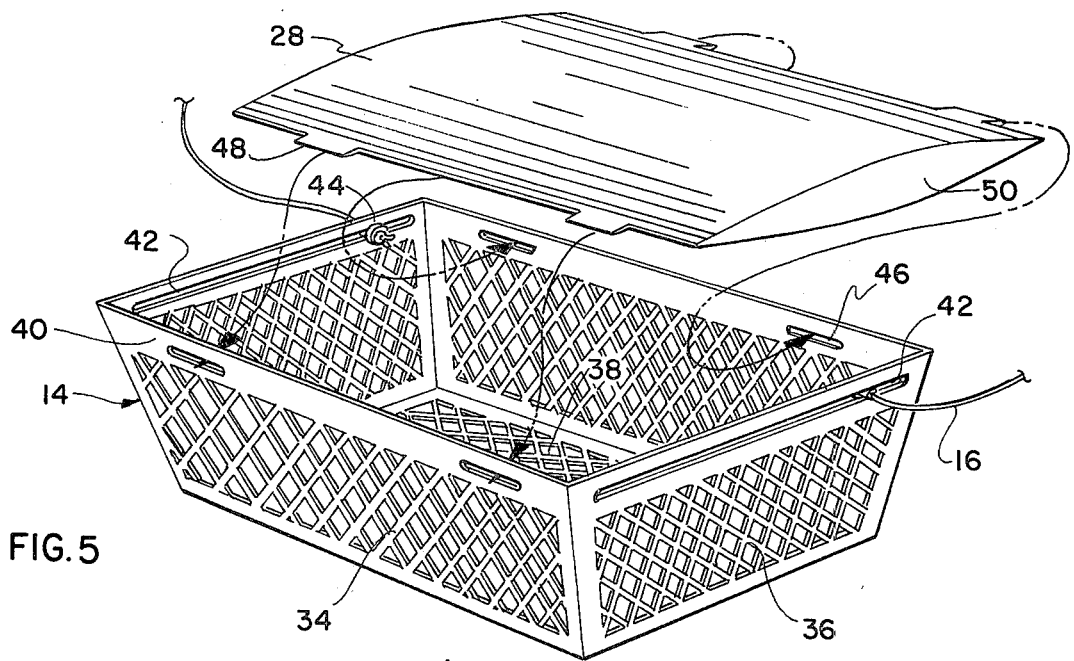
FIGS. 5 and 6 are isometric views of tray structure according to this invention.
Figure 6:
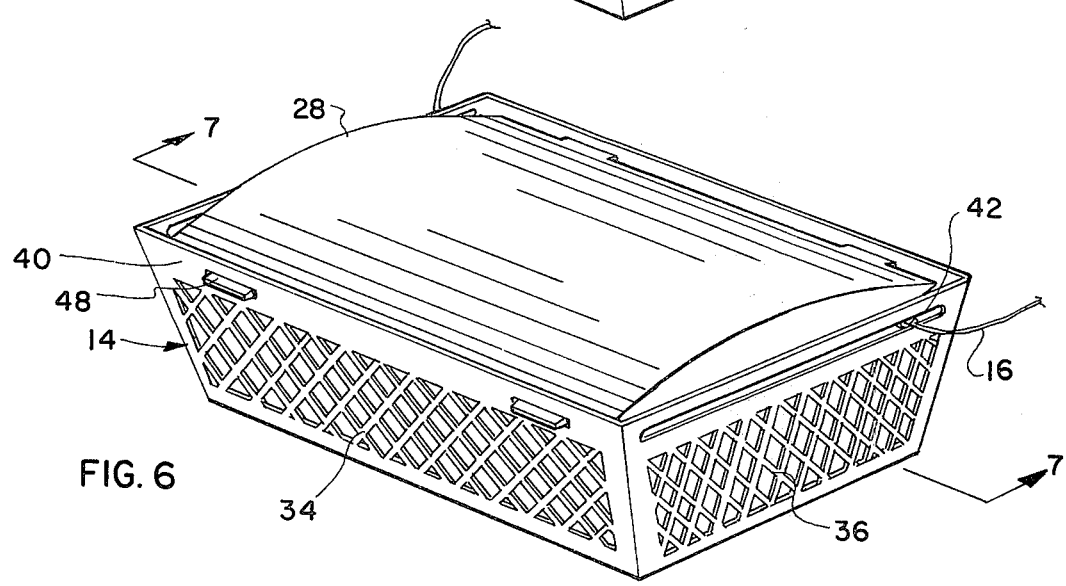
Figure 7:
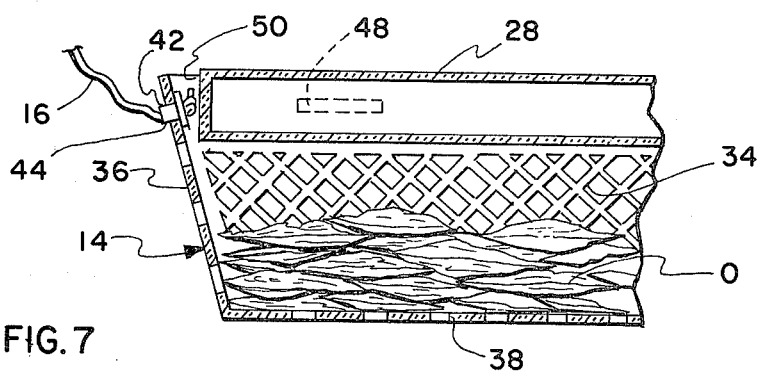
FIG. 7 is an elevational section adapted from line 7—7, FIG. 6.

FIGS. 5 through 7 illustrate special features of the trays which combine efficient function and use of space with safety and economy.

The body portions of the trays 14 are preferably of inverted truncated pyramidal shape and of one-piece molded plastic construction, with perforate sides 34 and 36 and bottom 38, and top portion open. Fibre glass reinforced epoxy is an example of suitable, relatively indestructible material.

The upper portion of the tray forms an integral frame 40 around the top, having two sets of slots, one set in the ends and one set in the sides. The first set of slots comprises a respective horizontal slot 42 extending symmetrically across most of the width of the upper edge of each end, providing sliding attachment for a bridle line 16 pendant from each long line. A fairlead thimble 44 on each line protects it from wear as it moves in the slot. The second set comprises a pair of spaced, co-aligned slots 46 in each side of the tray receiving a corresponding pair of tabs 48 extending laterally from the sides of the tray top 28. To attach the top, the tabs on one side are inserted, the frame is spread slightly, and the tabs on the other side are inserted. Removal involves simply a reversal of the attachment procedure.

The tapered or wedge-shape of the tabs, with thinner edge than root, promotes easy insertion and removal, and tightening under load when the sides and ends of the tray straighten under tension.

The top itself is of one-piece construction, rectangular in plan, and either hollow or foam filled to provide flotation for the tray. In elevation the top is thick along the centerline and tapers to the sides in a symmetrical airfoil section with blunt ends 50, to provide resistance to removal by wave action combined with flotation volume and clearance at the sides and ends, and greater stiffness and strength. The side clearance affords hand grips for spreading the frame for top securance and removal.

FIG. 7, a section, best shows the nearly abutting relation of the blunt ends of the top with respect to the inclined ends of the tray, forming at each end slot a protected recess in which the bridle line attachment can slide freely without fouling, and a grip for secure handling of trays loaded with oysters O.

Figure 8B:
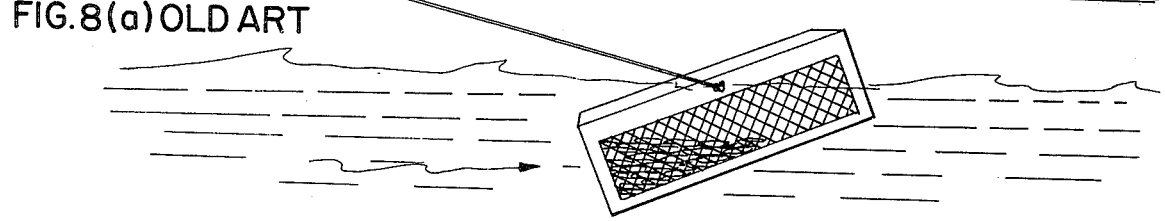
FIG. 8b is a side view of a tray and line detail according to this invention.
Figure 8B:
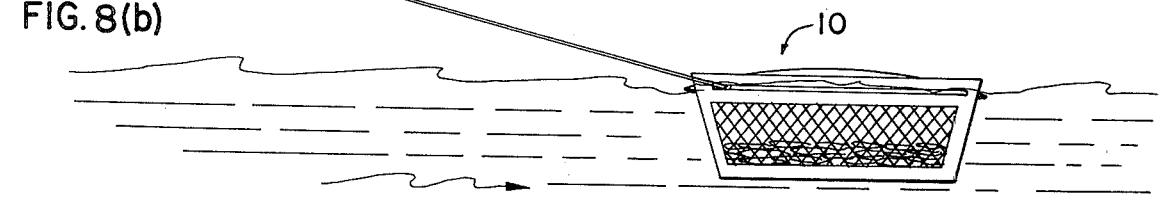

FIGS. 8a and 8b illustrate the importance of the provision of sliding bridle line attachment. It was found that using the old-art fixed-point attachment shown in FIG. 8a, loaded trays would respond to tide and wave action by tipping, shifting the load of oysters, and finally, capsizing.

At best, this exposed the oysters to sunlight through the bottom of the tray, and it often dumped the oysters by breaking out the stryofoam slabs used to float and cover the containers.

FIG. 8b shows how the system of the present invention causes each bridle line point-of-attachment to migrate toward the upstream side of the tray of this invention and support the upstream side of the tray against wave action. The sliding bridle line feature thus maintains a more even layer of oysters in the trays, and together with the inclined end contour of the trays, minimizes pounding, and helps prevent twisting and fouling of the bridle lines.

Figure 9:
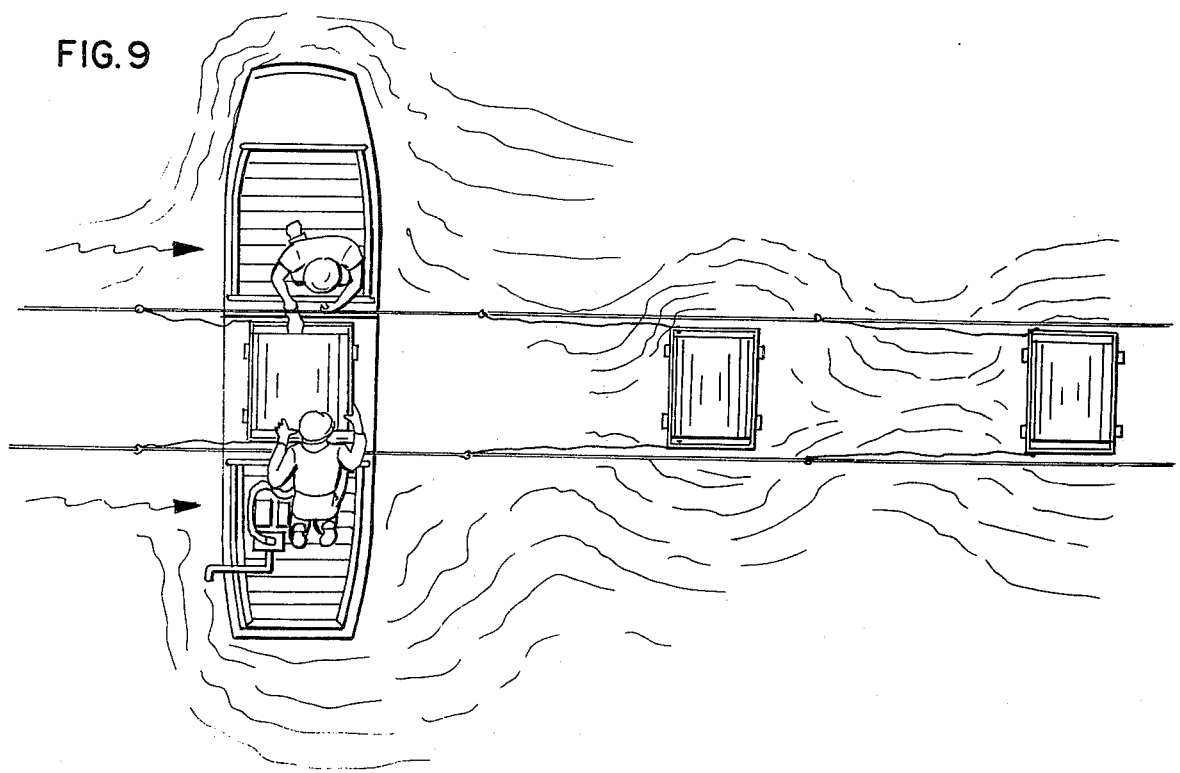
FIG. 9 is a plan view.

FIG. 9 indicates other advantageous coactions of the system of this invention. When working with closely spaced trays in strong tides or tides with accompanying winds, the tender boat drifts rapidly down against each succeeding tray in turn, often before work is completed on the preceding tray. The trays sustained by the bridle line attachment at the upstream end, resist riding over and submergence by the oyster tender boat, by action of the tray end incline which tends to rise up onto the low mid-section deck of the oyster tender boat. The sliding point of attachment feature makes loading easier since the upstream ends of the trays will always lift when the bridle lines are pulled up. The blunt ends of the tops permit standing them on end for storage and also permit wedging a number of tops on edge in a tray for transport. The trays themselves nest, to take up minimum space in storage.

The long lines serve as guides to retain the middle portion of the oyster tender boat in position to receive the trays successively.

The oyster tender boat has substantially equal lengths fore and aft of the mid-portion, balancing out tidal forces (arrows) which otherwise might rotate the boat out of working position through unbalanced force acting on a relatively longer bow or a relatively longer stern. The raised fore and aft portions of the oyster tender boat provide safe shielded spaces for operators and for cargo carried.

In conclusion, it will be appreciated that one man using the present invention can properly tend as many as one million oysters continuously, and two men together as many as three million oysters continuously, figures far beyond the capacities of any previously known system.

Obviously many modifications and variations of the present invention are possible in light of the above teachings. It is, therefore, to be understood that within the scope of the appended claims the invention may be practiced otherwise than as specifically described.

What is claimed and desired to be secured by United States Letters Patent is:

1. An oyster culture system for use in a tidal or similarly flowing body of water, comprising: a plurality of long lines, means securing the plurality of long lines in spaced proximity to each other and to the surface of said a body of water, a succession of sets of lines pendant from the long lines at spaced intervals therealong, a plurality of trays, respective means for floating each tray, a tray positioned for floating in said a body of water proximate each set of pendant lines, means attaching opposite end portions of the trays to respective pendant lines of a set, an oyster tender boat proportioned for deployment transversely beneath said plurality of long lines, the oyster tender boat having a midsection and cockpit structure proximate thereto in fore-and-aft relation, and the midsection having a substantially small amount of freeboard, whereby said trays may successively be manually drawn onto and discharged from said midsection with minimum effort and hazard.

2. An oyster culture system as recited in claim 1, wherein the means securing the plurality of long lines fix said long lines in substantial alignment with flow of said a body of water, wherein the means attaching opposite end portions of the trays include respective means horizontally movable relative to the trays, whereby, upon flow of said a body of water the points of attachment of the trays to the pendant lines position proximate the upstream side of the trays, thereby stabilizing the trays.

3. An oyster culture system as recited in claim 1, wherein the means attaching opposite end portions of the trays include means horizontally movable relative to each tray, whereby upon flow of said a body of water moving the trays along the long lines, the means attaching opposite end portions of the trays migrate toward the upstream side thereof, thereupon stabilizing the trays.

4. An oyster culture system as recited in claim 3, wherein the plurality of long lines comprises a laterally spaced pair of long lines, and wherein each set of pendant lines comprises a laterally spaced pair of pendant lines, thereby retarding twisting of the trays.

5. An oyster culture system as recited in claim 1, the midsection of the oyster tender boat having decking thereover, the cockpit structure defining a first cockpit proximately forward thereof and a second cockpit proximately rearward thereof, the cockpits having greater freeboard than the midsection.

6. An oyster culture system as recited in claim 5, the hull of the oyster tender boat extending substantially equal distances forward of and rearward of the midsection.

7. An oyster culture system as recited in claim 5, and means aboard the oyster tender boat for directing a stream of water over the midsection thereof for tray cleaning.

8. An oyster culture sytem as recited in claim 1, the trays having the general shape of an upwardly open inverted truncate pyramid with perforate structure defining bottom, sides and ends, and the means for attaching opposite end portions of the trays including means horizontally movable relative to the trays for stabilizing the trays upon flow of said a body of water moving the trays along the long lines.

9. An oyster culture system as recited in claim 8, the upper portion of each end of each tray having a horizontal slot thereacross, and the means horizontally movable comprising means proximate a terminal portion of each pendant line for movably engaging a respective horizontal slot.

10. An oyster culture system as recited in claim 9, said means for movably engaging a horizontal slot comprising thimble structure on said pendant line.

11. An oyster culture system as recited in claim 9, said means for floating comprising a top, means for removably attaching the top within the upper portion of the tray, the top having blunt ends and a length and thickness proportioned for fitting the tray inverted truncate pyramid shape while leaving clearance between the blunt ends of the top and the tray ends at said horizontal slot, thereby providing a protective recess for said means for movably engaging a horizontal slot.

12. An oyster culture system as recited in claim 11, said top having an airfoil section from side to side, the means for removably attaching the top including at least one lateral protrusion from the top and a recess in an upper portion of the tray positioned for receiving the lateral protrusion.

13. An oyster culture system as recited in claim 12, said lateral protrusion having a wedge shape proportioned for providing ease of insertion and tight fit in said slot when inserted.

14. An oyster culture tray comprising an inverted truncate pyramid perforate body portion including sides, ends, a bottom; a removable top in the form of a floatative member thick in the center and tapering to the sides, means for detachably securing the top to the body portion, and means for slidably securing said tray during flotation, including a respective slot extending horizontally and symmetrically across most of the width of the upper part of each end of said tray proximate to but spaced from each respective end of said top.

15. An oyster culture tray as recited in claim 14, wherein the means for detachably securing the top to the body portion includes a plurality of wedge-shaped tabs integral with the top and positioned for engaging slots in the body portion.

16. The method of tending a plurality of floating oyster culture trays in tidal waters, comprising the steps:
   a. fixing an elongate supporting means proximate the surface of said tidal waters in longitudinal alignment with the direction of tidal flow.
   b. securing with flexible means at serial intervals along the elongate supporting means said plurality of floating oyster culture trays,
   c. maneuvering any oyster tender boat transverse to said elongate supporting means and positioning a low midsection portion of the oyster tender boat therebeneath proximately upstream of the floating oyster culture tray farthest upstream relative to the direction of tidal flow,
   d. floating the oyster tender boat downstream while maintaining said positioning relative to said elongate supporting means and in succession raising each floating oyster culture tray over the downstream side of the midsection of the oyster tender boat, tending same, and discharging same over the upstream side of the oyster tending boat, thereby tending said plurality of floating oyster culture trays while maintaining control of the oyster tending boat and preventing any material dislodged incident to said tending from fouling oyster culture trays subsequent to the tending of same.

17. The method of claim 16, wherein in step (a), the elongate supporting means comprises a pair of laterally spaced long lines, wherein in step (b) the flexible means comprises paired bridle lines respectively affixed to the respective long lines,
   and wherein in step (b) the securing is securing movably in a horizontal direction,
   whereby said floating oyster culture trays are stabilized against tipping by said securing.

* * * * *